2,843,587

2 AMINO ETHYL 33 DIMETHYL NORCAMPHANE

Peter L. de Benneville, Philadelphia, Pa., assignor to Rohm & Haas Company, Philadelphia, Pa., a corporation of Delaware No Drawing. Application June 28, 1955
Serial No. 518,683

7 Claims. (Cl. 260—247)

This invention concerns amines of the structure

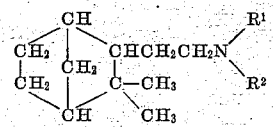

This invention also deals with a method for their preparation wherein 8-formyl camphane or homoisocamphenilanaldehyde is reacted with a secondary amine and the resulting enamine is reduced. Reduction may be accomplished with formic acid at 80° to 100° C. or more or with hydrogenation in the presence of a hydrogenation catalyst.

The enamines have been previously prepared and found to be unstable, readily hydrolyzing in aqueous systems and giving the reaction of aldehydes.

The compound 8-formyl camphane, as is known, can be prepared by reacting camphene and carbon monoxide in the presence of a cobalt catalyst in the Oxo process.

The secondary amines which can be used cover a wide range of types and sizes. They may be represented as $HNR^1R^2$, where $R^1$ and $R^2$ are the same as above and represent alkyl or alkenyl groups usually of not over 12 carbon atoms, cycloalkyl, aralkyl, and aryl groups when taken individually or when taken together $R^1$ and $R^2$ form a saturated divalent aliphatic chain of four to five atoms which with the nitrogen forms a five- to six-sided heterocycle as in morpholine, thiamorpholine, piperidine, pyrrolidine, trimethylpyrrolidine, N-methylpiperazine, methylmorpholine, methylpiperidine, and the like. Typical of these chains are $—CH_2CH_2OCH_2CH_2—$, $—CH_2CH_2SCH_2CH_2—$, $—CH_2CH_2CH_2CH_2CH_2—$, $—CH_2CH_2CH_2CH_2—$ and $—CH_2CH(CH_3)OCH(CH_3)CH_2—$. When $R^1$ and $R^2$ are individual groups, they may be methyl, ethyl, propyl, butyl, sec-butyl, isobutyl, amyl, hexyl, octyl, dodecyl, allyl, crotyl, undecenyl, dodecenyl, benzyl, methylbenzyl, cyclohexyl, methylcyclohexyl, phenyl, butylphenyl, chlorophenyl, etc.

The preferred groups are alkyl radicals of not over four carbon atoms and the above specified divalent aliphatic groups. The individual R groups may be the same or different.

Reaction of 8-formyl camphane and secondary amine may be first effected between 25° and 100° C. and the reaction product thereof then reduced. Again, 8-formyl camphane, secondary amine, and formic acid may be mixed and the mixture heated with evolution of carbon dioxide, usually between 80° and 100° C.

Hydrogenation of the reaction product of 8-formyl camphane and secondary amine may be accomplished at the temperature dictated by the catalyst chosen. Thus with platinum or palladium reduction can be completed at 25° to 75° C., while with Raney nickel temperatures from 120° to 150° C. may be used.

Further details are given in the following illustrative examples, wherein parts are by weight.

*Example 1*

To 42 parts of 8-formyl camphane there is added dimethylammonium formate, prepared by passing about 11 parts of dimethylamine as a gas into 11.5 parts of formic acid. The resulting mixture is heated on a steam bath with evolution of carbon dioxide for a total of five hours. The reaction mixture is treated with potassium carbonate and distilled. The main fraction is taken at 75°–76° C./1.7 mm. It amounts to 34 parts and corresponds in composition to

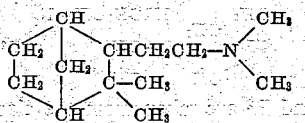

In the same way there may be reacted the Oxo aldehyde from dipentene, dimethylamine, and formic acid to give a tertiary amine of the same empirical formula. It distills at 140°–160° C./30 mm. The Oxo aldehyde from β-pinene reacted with dimethylamine and formic acid gives a tertiary amine of the same empirical composition which distills at 71°–78° C./1 mm.

*Example 2*

There are reacted 40 parts of 8-formyl camphane and 43 parts of dibutylamine. The reaction mixture is stirred and heated on a steam bath. It is taken up in 200 parts of heptane and 10 parts of Raney nickel is added. The mixture is heated under hydrogen in an autoclave at 130° C. for three hours at 1750 p. s. i. The autoclave is cooled and vented. The reaction mixture is filtered. The filtrate is distilled. At 125°–1350° C./1.7 mm. a fraction of 35 parts of fairly pure tertiary amine is obtained. It is dissolved in dilute hydrochloric acid. This solution is extracted with heptane. The acid solution is made basic with potassium hydroxide solution and extracted with toluene. The toluene layer is dried over potassium carbonate and distilled. At 130°–131° C./1.6 mm. there is obtained a fraction of 23 parts of the desired tertiary amine

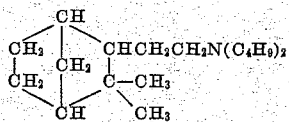

It has a refractive index, $n_D^{25}$, of 1.4703.

*Example 3*

There are reacted 42 parts of 8-formyl camphane and 30 parts of morpholine. The reaction mixture is treated as above, being heated on a steam bath, extracted with a close-cut petroleum naphtha, and hydrogenated over Raney nickel. The filtered reaction mixture is then distilled. The main fraction is taken at 102°–104° C./0.5 mm. It is a tertiary amine corresponding in composition to

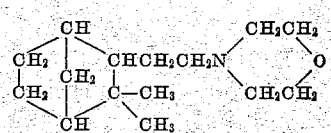

It has a refractive index of 1.4981 at 25° C.

In the same way there are reacted 8-formyl camphane and piperidine (26 parts for the above 27 parts of morpholine). The resulting enamine is reduced and the product purified by distillation, the main fraction of the analogous piperidino compound being taken between 85° and 97° C. at 0.5 mm. pressure.

Reaction of 42 parts of 8-formyl camphane and 30 parts of pyrrolidine followed by hydrogenation and distillation gives a main fraction of the pyrrolidino analogue coming over at 80°–92° C./0.5 mm.

These amines are useful for forming salts with nitrophenols, 2,4-dichlorophenoxyacetic acid, 2,4,5-trichloroacetic acid, penicillin, bis(hydroxychlorophenyl)methane or sulfide, and the like. The amines are effective corrosion inhibitors for strong acids. For example, the rate of attack of steel by dilute hydrochloric acid solutions can be reduced over 90% or more by the presence of a few tenths percent of one of the amines of this invention in the acid.

I claim:

1. A compound of the formula

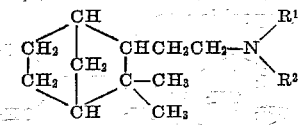

where $R^1$ and $R^2$ are taken from the class consisting of lower alkyl groups when taken individually and when taken together saturated divalent aliphatic chains of four to five atoms which form a five- to six-sided heterocyclic amine with the nitrogen.

2. A compound of the formula

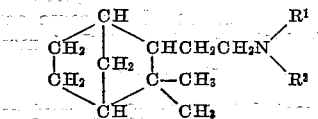

where $R^1$ and $R^2$ are lower alkyl groups.

3. The compound

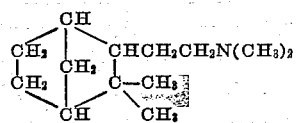

4. The compound

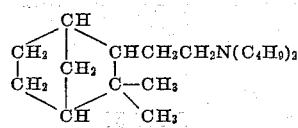

5. A compound of the formula

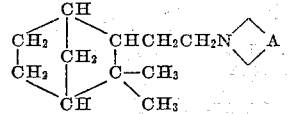

where A is a saturated divalent aliphatic chain of four to five atoms forming a five- to six-sided heterocyclic amine with the nitrogen.

6. The compound

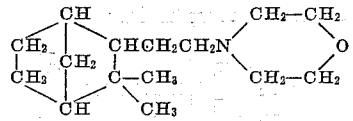

7. The compound

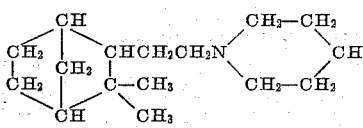

References Cited in the file of this patent

UNITED STATES PATENTS 2,578,787     De Benneville _____ Dec. 18, 1951

OTHER REFERENCES

Huckel et al.: Berichte, vol. 70B, pp. 959–963, 1937.